United States Patent
Meyer et al.

[15] 3,704,863
[45] Dec. 5, 1972

[54] APPARATUS FOR MIXING A PIGMENT DISPERSION INTO A POLYAMIDE MELT

[72] Inventors: Ernst Meyer, Oberbruch/Rhineland; Wolfgang Grimm, Erlenbach; Klaus Gerlach, Obernau; Helmut Linhart, Aschaffenburg, all of Germany

[73] Assignee: Akzona Incorporated, Asheville, N.C.

[22] Filed: April 9, 1970

[21] Appl. No.: 31,443

Related U.S. Application Data

[62] Division of Ser. No. 777,370, Nov. 20, 1968, Pat. No. 3,560,430.

[30] Foreign Application Priority Data

Nov. 21, 1967    Germany..........P 16 94 348.9

[52] U.S. Cl..................................................259/8
[51] Int. Cl. .............................................B01f 7/16
[58] Field of Search.......................259/7, 8, 23, 24

[56] References Cited

UNITED STATES PATENTS 2,787,447   4/1957   Crawford.......................259/8
3,425,667   2/1969   Schutte et al..................259/7

FOREIGN PATENTS OR APPLICATIONS 314,058   1/1934   Italy...............................259/8

*Primary Examiner*—Walter A. Scheel
*Assistant Examiner*—Philip R. Coe
*Attorney*—Johnston, Root, O'Keeffe, Keil, Thompson & Shurtleff

[57] ABSTRACT

Process and apparatus for the uniform mixing of a polyamide melt with a pigment dispersed in a liquid medium soluble in the polyamide wherein the melt is divided, immediately after introduction of the liquid pigment dispersion as a thin liquid stream, into planar segments or displaced layers having a maximum thickness of about 1,500 microns, preferably 20 to 850 microns, using a paddle wheel stirring mechanism at the inlet end of an elongated mixing vessel tapering radially inwardly down to its outlet or discharge end.

This invention generally relates to a process for continuously mixing a pigment dispersion into a high molecular weight organic polymer which is in the molten state, for example nylon 6 (polycaprolactam), nylon 6,6 (polyhexamethylene adipamide) or other polyamides, particularly at the conclusion of a continuous polymerization or polycondensation process.

7 Claims, 1 Drawing Figure

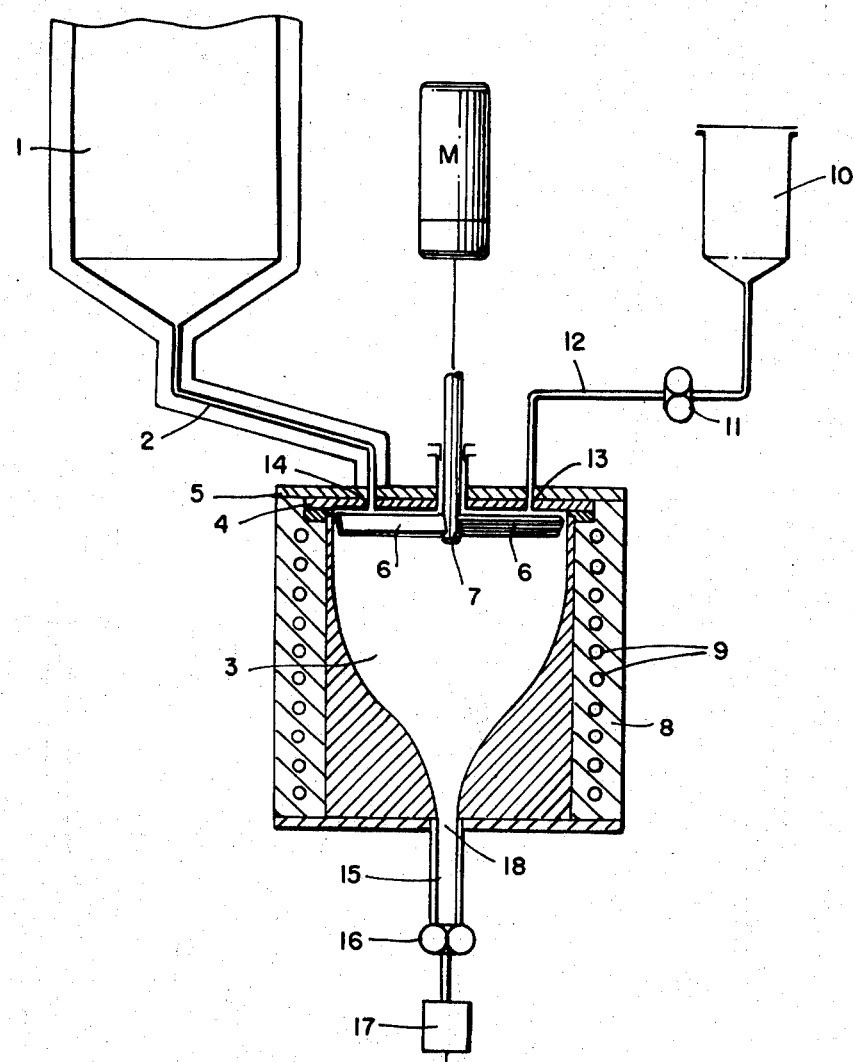

APPARATUS FOR MIXING A PIGMENT DISPERSION INTO A POLYAMIDE MELT

The present application is a division of application Ser. No. 777,370, now U.S. Pat. No. 3,560,430 filed Nov. 20, 1968.

The mixing of a pigment dispersion into the initially prepared melt of a high molecular weight organic polymers, e.g., in conjunction with a continuous polycondensation or polymerization process, has not yet been solved in a satisfactory manner. It is true that a process for the production of delustered or colored structures of polyamides, polyesters, polyurethanes or polyureas is known, in which a mixture of a finely divided pigment with a silicone is incorporated into the melt after it leaves the polymerization apparatus and the melt is then shaped, e.g., into films, filaments or the like. However, a pigment dispersion in which the dispersing agent or liquid vehicle is a silicone oil, or generally any liquid which is insoluble in the polymer, is unsuitable for the manufacture of spun-dyed yarns and the like. The pigment incorporated into ultrafine silicone oil droplets also exists in isolated form in the solidified polymer; that is to say, it is not actually incorporated into the polymer. In particular, the extraction of monomers from a polymer such as nylon 6, for example, results in a washing out of those ultrafine silicone oil droplets having pigment incorporated therein which are disposed at or in the vicinity of the surface. This danger also exists to a considerable extent with a subsequent hydrosetting treatment. Furthermore, the droplets of silicone oil or any other liquid insoluble in the polymer have a disturbing effect, for example, when drawing or stretching the spun fibers, filaments or yarns.

When working with polyamide melts, it has therefore proved to be necessary to use a dispersing agent which is soluble in the polyamide; otherwise, a satisfactory incorporation of the pigment particles into the polymer is not achieved. In addition, it has also been shown to be advantageous for the dispersing agent to be soluble in water, since the possibility then exists for washing out this agent, for example, while simultaneously extracting the monomers from nylon 6.

The mixing of pigment dispersions into a prepared polyamide melt however presents considerable difficulties where the liquid dispersing agent is necessarily soluble in the melt, because immediately after the introduction of the dispersion into the melt, the soluble liquid diffuses into the melt at a very high rate of speed. A so-called "drying out" of the pigment dispersion thus takes place, and this leads to the individual pigment particles caking together or agglomerating into aggregates of considerable size which then makes the melt unsuitable for spinning or extrusion through a small orifice. Consequently, it has also been a usual practice, when manufacturing fiber-forming linear polyamides which are to be spun-dyed or delustered, to produce the melts for the dye-spinning in an autoclave, the pigment suspension always being admixed at the start of the polycondensation process. This batch-wise production of the melt is a considerable disadvantage as compared to the more desirable continuous polycondensation in which the resulting melt can be immediately directed to the continuous spinning operation with or without intermediate granulation of the melt.

In the copending application of Meyer et al, Ser. No. 682,967, now abandoned, filed Nov. 14, 1967, which is a continuation-in-part of the parent application, Ser. No. 546,597, now abandoned, filed May 2, 1966, a process for the production of spun-dyed filaments or yarns from pigmented polyamides is described, in which butyrolactam is used as the essential dispersing agent. This dispersing agent is very suitable for the preparation of pigment dispersions which are to be added to polyamides before or at the start of the polycondensation process; nevertheless, the difficulties described in the preceding paragraph occur when they are added after polycondensation to the prepared melts.

One object of the invention accordingly is the provision of a process by which it is possible for a pigment dispersion, the liquid vehicle or dispersing medium of which is soluble in the polyamide, to be mixed into the initially prepared melt of a polyamide without resulting in the occurrence of those agglomerates of pigment particles which are quite troublesome and which severely interfere with the spinning process, e.g., by clogging the spinning orifices.

Another object of the invention is to provide an apparatus for uniformly admixing the polyamide melt with the polyamide dispersion in a continuous manner such that the pigment becomes uniformly distributed throughout the melt quite rapidly before the liquid dispersing agent diffuses into the polyamide in which it is highly soluble.

These and other objects and advantages of the invention are explained in greater detail in the following specification.

It has now been found, in accordance with the invention, that especially advantageous results are achieved in a process for continuously mixing a pigment dispersion into a polyamide melt, where the liquid medium used to obtain a homogeneous distribution of the pigment in the initial dispersion is soluble in the polyamide, if the polyamide melt is divided immediately after introduction of a thin liquid stream of the pigment dispersion into planar segments or layers having a layer thickness of less than 1,500 microns, the planar segments being displaced relatively to one another, and continuously withdrawing the resulting mixture in a direction substantially perpendicular to the planar segments. The division of the polyamide melt into planar segments can be easily accomplished in a substantially cylindrical mixing zone by means of rotating shearing edges arranged closely adjacent to a flat circular surface at the inlet side of the mixing zone while continuously introducing the polyamide and a thin stream of the pigment dispersion through the flat surface into the mixing zone. The plane or cross section of the mixing zone at which the melt is divided into planar segments or layers is thus advantageously spaced not more than about 1,500 microns from the point of entry of the pigment dispersion, preferably so as to provide a layer thickness of at least 20 microns up to about 850 microns.

It was also found that the peripheral speed of the shearing edges, e.g., as provided by stirrer blades, at the ends of the blades or the outer periphery of the layer of melt should not be lower than approximately 0.4 m/sec and not more than approximately 3.1 m/sec; the range between a lower peripheral speed of about 1.2 m/sec and an upper peripheral speed of about 2.3 m/sec has proven to be most desirable. Depending on the temperature of the melt and the nature of the dispersing agent, individual lumps or aggregates of pigment are already formed at peripheral speeds which are below 1.0 m/sec, and these aggregates become so marked in ranges below about 0.4 m/sec that they have a highly disturbing effect on any subsequent spinning process.

It is generally desirable to maintain the polyamide melt in the mixing vessel at a temperature of approximately 260° to 290° C., always sufficiently high to permit the desired mean flow velocity but below those temperatures capable of causing further polycondensation or damage to the melt or the pigment dispersion. In most cases, the pigment dispersion is added to the melt in an amount not greater than about 20 percent by weight, preferably about 1 to 10 percent by weight, depending upon the desired content of pigment in the final spun-dyed or delustered product. Thus, the pigment content of the final product is generally anywhere from 0.01 to 10 percent, but usually up to about 5 percent and preferably from about 0.1 to 3 percent, by weight with reference to the melt. Butyrolactam or a mixture of butyrolactam containing a minor proportion of caprolactam is especially useful as the liquid dispersing agent for the pigment dispersion.

According to the prior art, it was to be expected that a very intensive stirring and mixing operation would be necessary to uniformly distribute the pigment in the melt. However, it has surprisingly been found that this is not the case but that the essential feature according to the invention resides in the step of dividing the melt into very thin layers or planar segments with a thickness in the range of the aforementioned dimensions, and that an intensive stirring operation is not necessary or even desirable to produce this effect, provided that the condition of the layer thickness, on the one hand, and the stirring speed, on the other hand, are kept within the limits indicated. These are produced by effecting a suitable stirring operation in a cross section of the mixing vessel which is so adapted to the melt throughput that the mean flow velocity of the melt through said cross section is between $4 \times 10^{-4}$ and $7 \times 10^{-4}$ m/sec, advantageously between $5 \times 10^{-4}$ and $6.5 \times 10^{-4}$ m/sec, this mean flow velocity being measured in the axial direction, i.e., perpendicular to the cross-section of the mixing zone and in the axial direction of the melt flow in the mixing vessel.

Apparatus which is especially suitable for carrying out the process of the invention includes a mixing vessel which is radially symmetrical around a central axis with the inlet end of the vessel being enclosed or covered by a flat circular plate member or surface perpendicular to said central axis and with the sides of the vessel tapering radially inwardly down to the diameter of an outlet opening at the opposite end of the vessel. The tapered structure of the vessel is advantageously pear-shaped, i.e., starting with a gradual reduction in the diameter of the vessel, e.g., at or just below the lower edges of stirring blades in the upper mixing zone, and then a more rapidly increasing reduction in diameter as the sides of the vessel extend downwardly to the discharge or outlet opening. In this manner, the mean flow velocity of the melt in the upper mixing zone is maintained at a relatively slow rate while increasing the mean flow velocity gradually as the mixture proceeds through the vessel in an axial direction.

The apparatus also essentially includes a rotatably driven paddle wheel stirring means comprising a drive shaft with its axis of rotation coinciding with the central axis of the mixing vessel and a plurality of pitched blades mounted radially on the drive shaft with an angle of pitch of about 10° to 30°, preferably between about 15° and 24°, especially when using three or four stirring blades mounted symmetrically or equidistantly from each other around the drive shaft. These blades should be positioned at a distance of about 800 to 2,000 microns from the flat plate or covering surface at the inlet end of the vessel, preferably such that the leading or upper edge of the blades are located at a distance from the flat circular surface of about 1,000 to 1,500 microns. These blades also extend parallel to the flat plate and radially outwardly in close proximity to the inner circumferential wall surface of the mixing vessel.

The mixing vessel must also include inlet means for the injection of a narrow or thin liquid stream of the pigment dispersion, together with means to conduct and supply a metered amount of the pigment dispersion into the vessel. The inlet means for this dispersion should be located on the outer one-third of the flat circular surface or cover plate but at a distance of at least about one-sixth of the length of a stirring blade from the inner circumferential wall surface of the mixing vessel. There may be one or more of such inlets adapted to rapidly inject the pigment dispersion as the melt is being cut or sheared into displaced layers or segments, but good results are achieved with a single narrow bore or conduit of small diameter extending parallel to the axis of rotation of the drive shaft.

Inlet means in the cover plate should also be provided for the polymer melt, preferably at one or more points also located in the outer one-third of the flat circular surface but at least about one-sixth of a radius inwardly from its outer periphery corresponding to the outer peripheral movement of the stirring blades. Again a single inlet for the melt is sufficient, preferably at a point diametrically opposed to the inlet for the dispersion. Finally, it is desirable to provide means to continuously withdraw a metered amount of the liquid mixture in the vessel through the outlet opening.

The circular cross section of the vessel at the height or location of the paddle wheel stirring blades is advantageously selected at approximately 200 cm$^2$ per ton of 24 hour daily throughput. The stirrer, which preferably comprises three to four blades, is operated at a speed of rotation of about 40 to 400 r.p.m., advantageously from 100 to 300 r.p.m. (revolutions per minute). The pitch angle of the stirrer blades, as noted above, is generally between 10° and 30°, advantageously between about 15° and 24°.

It has been found that a particularly favorable range exists as regards the ratio by weight between the dispersing agent and pigment, this ratio being selected such that in carrying out the mixing of the stream of pigment dispersion flowing onto the melt layer, the diffusion of the soluble liquid dispersant into the melt and the resulting drying out of the suspension occurs only after the distribution of the pigment has been sufficiently effected. Especially when using butyrolactam as a vehicle or dispersing agent for the pigment, it was found that the favorable range or proportion of pigment is about 10 to 50 percent and advantageously 20 to 40 percent by weight with reference to the total weight of the dispersion. With a lower proportion of pigment, the necessary quantity of the dispersing agent and more especially the quantity of the supplied dispersion becomes too great, while the danger of agglomeration is very greatly increased when the indicated limit is exceeded.

It is to be noted here that one must normally employ a very finely divided pigment with a particle size not larger than about 1 $\mu$ (micron), since particles greater than 1 $\mu$ are not considered to be permissible at the time of preparing the initial pigment dispersion. When carrying out the process according to the invention as set forth hereinabove, it is found that the average pigment size likewise remains below this limit. Agglomerates up to a size of about 8 to 10 $\mu$ are so rarely encountered that they do not interfere with the spinning process.

It is true that with sufficiently fine distribution of the pigment and careful mixing procedures, most of the pigments which are resistant to polycondensation temperatures can be introduced in the so-called VK tube at the start of the condensation process. However, a change in color necessitates a stoppage of at least several days, since the VK tube must be initially cleaned in a very tedious and time-consuming process. Moreover, with the addition of the pigment dispersion to the monomers or precondensate batch before the polycondensation, it is only possible to use those pigments which are very resistant to condensation. With the present invention, however, there now becomes available a whole series of pigments with very desirable properties, such as fastness to light and bleaching, illuminating power and the like, which can certainly survive the mixing and spinning process, whereas they are not sufficiently resistant to the polycondensation process.

For the first time, it has also become possible for these pigments to be added continuously by means of the process according to the invention, since they satisfactorily survive the relatively short residence times in the polyamide melt.

It has moreover surprisingly been established that the pigment dispersion can be added cold, i.e., at about room temperature, without the uniform or homogeneous distribution of the pigment in the melt being negatively influenced to any measurable degree.

The invention is also further explained with reference to the accompanying drawing, the single FIGURE of which is a partly schematic representation of the process and apparatus according to the invention.

The melt coming from a polymerization or melting vessel as indicated at 1 passes through a heated pipe 2 into a mixing vessel 3 which tapers downwardly in pear-shaped form, into which the melt enters through an opening or bore 14 in the cover plate or plates 4 and 5. Arranged immediately beneath the lower cover plate 4 of the symmetrical vessel 3 is a propeller-type or paddle blade stirrer consisting essentially of the pitched blades 6 which are radially mounted on the motor driven drive shaft 7 so as to revolve at a very small distance from the cover plate 4. The mixing vessel is heated, advantageously by means of a heating jacket 8 having conduits 9 through which a suitable heating fluid can be passed for indirect heat exchange.

The pigment dispersion which is supplied from a storage vessel 10 and which is to be admixed with the polymer passes through a gear wheel metering pump 11 and pipe 12 to an opening or bore 13, which is likewise situated in the cover plate or plates of the vessel 3, at approximately the same distance from the stirrer axis as the opening for the melt. These bores or inlet openings are preferably parallel to the rotating axis of the stirrer.

The revolving blades 6, the speed of which is adjusted to the throughput, divides the melt together with the pigment dispersion entering at 13 into thin layers or planar segments which have a thickness smaller than 1,500 $\mu$ and advantageously smaller than 850 $\mu$ but at least 20 $\mu$. Surprisingly an extra-ordinarily fine and uniform pigment distribution is achieved by this simple expedient.

The melt is withdrawn from the mixing vessel 3 by way of a discharge pipe 15 and a metering pump 16 where it is advantageously first of all worked up into a granulated form, e.g., by a screw extruder 17 equipped for granulation. Especially when the pigmented and granulated polyamide material is nylon 6 (polycaprolactam), the material is subjected to an aqueous extraction process for removing the monomeric fractions or residue, it also being possible at this point to simultaneously wash out the dispersing agent, provided it is also soluble in water as well as in polyamide.

The throughput of the polyamide melt as it proceeds from the inlet end of the mixing vessel 3 down to the outlet opening 18 can be easily adjusted by means of the gear wheel metering pump 16. Due to the tapering side walls of the vessel, it will be apparent that the melt moves downwardly or axially of the vessel most slowly in that zone of the mixer having the greater diameter, i.e., in and immediately adjacent to the rotating paddle blades 6. The mixing or distribution of the pigment in the polyamide melt takes place almost completely in this upper mixing zone of greatest diameter, provided that the peripheral speed of the blades is at least about 500 times the axial mean flow velocity of the melt. Due to the shearing forces applied by the rotating blades, the melt and the added pigment dispersion also have a rotational direction of movement in the planar segment or layer as it is formed, the rotational mean flow velocity over a cross section of the layer being relatively difficult to determine although it is obviously much less than the peripheral speed of the blades. Surprisingly, high shearing forces or an intensive mixing action is not at all essential provided that the layer thickness is maintained within the limits defined herein. Then, in the lower portion of the mixing vessel where the cross-sectional diameter decreases radially inwardly, the axial mean flow velocity of each displaced or segmented layer of the melt gradually increases so that in effect each layer tends to become gradually thicker without any high degree of mixing between adjacent layers. Nevertheless, the distribution of the pigment remains quite uniform, not only in each layer but also throughout a continuous run extending over a long period of time.

When carrying out the process according to the invention, it has thus been found that the most important feature of the process is to avoid agglomeration of pigment particles immediately after the introduction or injection of the pigment dispersion as a thin liquid stream at the inlet end of the mixing vessel. Where this is achieved, as is made possible for the first time by the process of the invention, any inhomogeneities which still exist in the pigment distribution can be completely balanced out during the subsequent melting of the granulate, for example in an extruder, the fine distribution of the pigment particles being maintained.

The invention is further explained by the following examples which are intended to be illustrative only. As the mixing device in these examples there is used a vessel as shown in the drawing with a diameter of 152 mm at the upper inlet end where a four-bladed stirrer with a pitch angle of the stirrer blades of 20° is so arranged that the upper or leading blade edges move about 1,200 $\mu$ below the inlet point of the melt and also that of the pigment dispersion on the lower flat surface of the plate 4. Butyrolactam was employed in both examples as the dispersing agent which is soluble in the polyamide.

The values for the pigment distribution produced in the melt when working in accordance with the examples are set out in Table 1 for Example 1 and in Table 2 for Example 2.

The figures indicated in the tables in respect of the size distribution of the pigment particles, including agglomerate particles, were determined by microscopic counting of 80 different microtome preparations with a layer thickness of about 10 $\mu$ and with a magnification of 1:450. The surface investigated was 0.26 mm². A count was made only of those particles having a size of more than 2 $\mu$, it being understood that these generally represent agglomerates since the average individual particle size is less than 1 $\mu$.

EXAMPLE 1

The melt throughput is 670 g/min. The pigment dispersion entering through an opening with a diameter of about 2 mm. contains 25 percent by weight of cadmium orange and is injected into the vessel at the rate of 25 g/min. The values set out in Table 1 for the particle size distribution are obtained in the microtome cuttings of the pigmented product which contain 1 percent by weight of cadmium orange, these values varying depending on the speed of rotation of the stirrer.

EXAMPLE 2

The melt throughput is 277 g/min. The injected pigment dispersion contains 25 percent by weight of titanium dioxide and is introduced into the vessel at a rate of 17.8 g/min., so that the pigmented polymer leaving the mixer contains 1.60 percent by weight of titanium dioxide. The speed of rotation of the stirrer is 250 r.p.m. The pigment count by particle size yields the values set forth in Table 2.

TABLE 1

| r.p.m. of stirrer | Counted particles >2 $\mu$ per 0.26 mm² | Distribution of the particles >2 $\mu$ in the size classifications: | | | |
|---|---|---|---|---|---|
| | | 2–4 $\mu$ | 4–8 $\mu$ | 8–16 $\mu$ | 16–25 $\mu$ |
| 143 | 189 | 171=90.5% | 7=3.7% | 9=4.8% | 2=1.0% |
| 200 | 179 | 166=92.6% | 4=2.4% | 6=3.3% | 3=1.7% |
| 300 | 167 | 156=93.4% | 8=4.8% | 3=1.8% | — |
| 400 | 168 | 158=94.0% | 10=6.0% | — | — |

TABLE 2

| r.p.m. of stirrer | Counted particles >2 $\mu$ per 0.26 mm² | Distribution of the particles >2 $\mu$ in the size classifications: | | | |
|---|---|---|---|---|---|
| | | 2–4 $\mu$ | 4–8 $\mu$ | 8–16 $\mu$ | 16–25 $\mu$ |
| 250 | 146 | 142=97.3% | 4=2.7% | — | — |

THE INVENTION IS HEREBY CLAIMED AS FOLLOWS:

1. Apparatus for the continuous mixing of a polyamide melt with a liquid pigment dispersion which comprises:
   a mixing vessel which is radially symmetrical around a central axis, the inlet end of said vessel being closed by a flat circular surface perpendicular to said central axis and the sides of said vessel tapering radially inwardly down to the diameter of an outlet opening at the opposite end of said vessel,
   a rotatably driven paddle wheel stirring means including a drive shaft with its axis of rotation coinciding with said central axis and a plurality of pitched blades mounted radially on said drive shaft with an angle of pitch of about 10° to 30°, said blades being positioned at a distance of about 800 to 2,000 microns from said flat circular surface and extending parallel thereto radially outwardly in close proximity to the inner circumferential wall surface of said mixing vessel;
   inlet means on the outer one-third of said flat circular surface but at a distance of at least about one-sixth of the length of a stirring blade from the inner circumferential wall surface of the vessel for the injection of a narrow stream of said liquid polymer dispersion, together with means to conduct and supply a metered amount of said dispersion into said vessel;
   separate inlet means in said flat circular surface to continuously supply the polyamide melt into said vessel; and
   means to continuously withdraw a metered amount of the liquid mixture in said vessel through said outlet opening.

2. Apparatus as claimed in claim 1 wherein the distance from the leading or upper edge of said stirring blades from said flat circular surface is about 1,000 to 1,500 microns.

3. Apparatus as claimed in claim 1 wherein the separate inlet means for said polyamide melt is also located in the outer one-third of said flat circular surface but at a distance of at least about one-sixth of the length of a stirring blade from the inner circumferential wall surface of said vessel.

4. Apparatus as claimed in claim 3 wherein each of said inlet means is arranged to inject a fluid in a direction extending parallel to the axis of rotation of said stirring means.

5. Apparatus as claimed in claim 3 wherein said inlet means are arranged in diametrically opposed positions in said flat circular surface.

6. Apparatus as claimed in claim 1 wherein the cross-sectional area of said vessel at the position of said stirring means has an area of approximately 200 cm². per ton of 24 hours daily throughput.

7. Apparatus as claimed in claim 1 wherein said paddle wheel has three to four symmetrically mounted stirring blades with an angle of pitch of each blade of between about 15° and 24°.

* * * * *